Aug. 11, 1959    A. J. WALTER, JR    2,899,232

BOTTLE CHUCK

Filed Dec. 28, 1956

INVENTOR.
ANDREW JUDSON WALTER JR

BY
J. A. Grier
ATTORNEY

United States Patent Office 2,899,232
Patented Aug. 11, 1959

2,899,232

BOTTLE CHUCK

Andrew Judson Walter, Jr., Hackensack, N.J., assignor to The Kraissl Company, Inc., Hackensack, N.J., a corporation of New Jersey Application December 28, 1956, Serial No. 631,291

4 Claims. (Cl. 294—65)

This invention has for an object the provision of apparatus for handling bottles and adapted to pick up bottles, move bottles from one place to another, and adapted to release said bottles after moving them.

Another object of the invention is the provision of a bottle chuck adapted to pick up a capped bottle by means of a plurality of engaging jaws which collectively engage the capped bottle, and pneumatic means to control the engagement of said jaws with and the release of said jaws from said bottle.

A further object of the invention is the provision in a bottle chuck of the character described of means to cause said chuck to pick up capped bottles and to reject any bottle which does not have a cap.

Other objects and advantages of the invention will be apparent to those skilled in the art upon a study of this specification and the accompanying drawings.

Referring to the drawings which are given by way of example to illustrate the invention:

Figure 1:
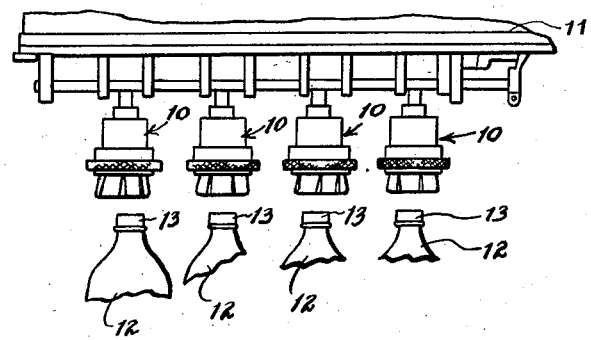
Figure 1 is a view showing a group of the bottle chucks on a common support, about to be engaged with a group of bottles.

Referring first to Figure 1, a series of bottle chucks 10 (four in number, for example) is carried on a suitable support 11 and positioned in vertical alignment with a like number of bottles 12 having caps 13 thereon. The support 11 is considered to be movable, and the combination is devised to descend upon the bottles 12, engage the capped necks of the bottles, lift them bodily and move them to another position; for example the bottles 12 may be positioned on a conveyor and may be presumed to have been filled with some liquid and capped by the caps 13. Now, in order to move them out of the way for some succeeding bottles the chucks 10 descend upon the capped bottles, picking them up and moving them to a position at least partially within a packing case, for example, and then they release the bottles and return to pick up a succeeding group of bottles, such return being effected by the movement of the support 11.

Figure 2:
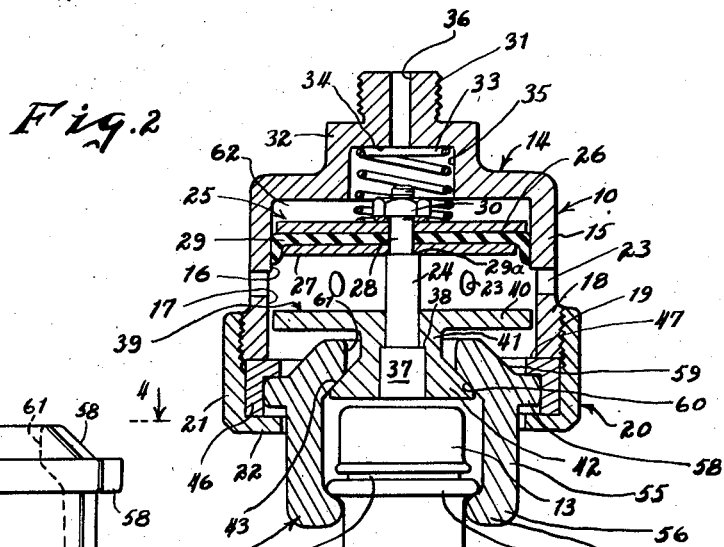
Figure 2 is a cross-sectional elevation of one of the chucks shown in Figure 1.
Figure 3:
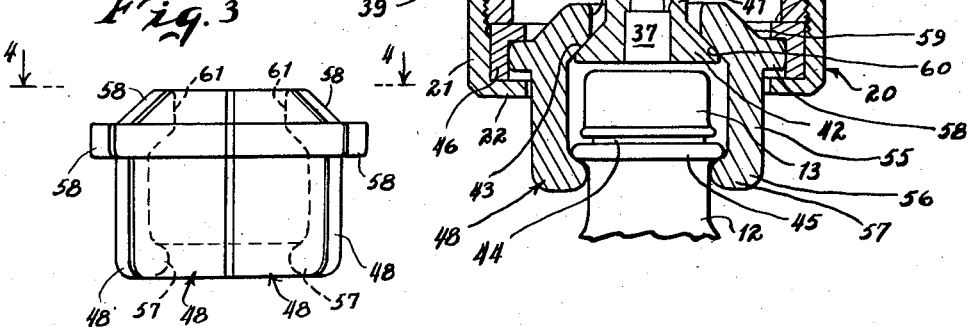
Figure 3 is a view of the chuck per se removed from the structure shown in Figure 2.
Figure 4:
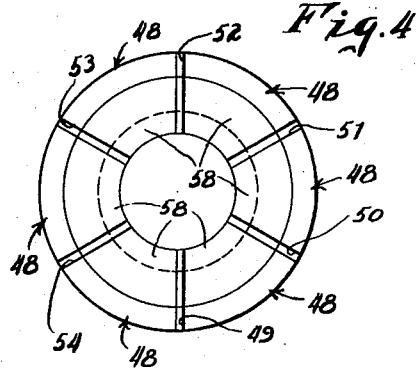
Figure 4 is a plan view taken along the line 4—4 of Figure 3.

Referring to Figures 2, 3 and 4, the structure of a single one of these bottle chucks is shown in detail and is described as follows: The bottle chuck 10 has a body 14 with a comparatively short cylindrical portion 15 with an interior bore 16. The interior bore is stepped and the bore 16 is smaller in diameter than the bore 17. The lower portion 18 of the cylindrical body 15 carries external threads which are engaged by internal threads at 19. The internal threads are formed in a second cylindrical portion 20 which has an outer wall 21 and a flanged portion 22, the function of which will be presently described.

Returning to the cylindrical portion 15, 18 a series of holes 23 is formed in the wall of 18 where it joins the wall 15 to provide passages for air into and out of the cylindrical body 15, 18. Within the interior bore 16 is a piston 25 which is comprised of a disc member 26 and a second disc member 27 carried on a shank portion 28 of a piston rod 24. The portion 28 terminates on a shoulder 29a between the portions 24 and 28. Clamped against this shoulder with a leather washer 29 or the like therebetween are metallic discs 27 and 26, respectively, and these are secured on the portion 28 by means of a nut 30.

A smaller bore 35 is formed in a boss portion 32 of the body 10, and positioned within this bore 35 is a helical spring 33. This spring bears against a wall 34 forming the bottom of the bore 35 and the other end of this spring bears against the disc 26. Preferably formed integral with the boss portion 32 is a smaller, threaded boss portion 31 which has a passage 36 therein communicating with the bore 35.

The piston rod 24 has an enlarged portion 37 which forms a shoulder 38 between the diameter 24 and the diameter 37. A clamp 39 has a disc portion 40, and formed integral therewith is a boss 41 which has a camming head 42 with slanting camming surfaces 43 formed thereon.

The bottle 12 (Fig. 2) has a cap supporting portion 44 that supports the cap 13 and below and joining the portion 44 is an annular ring-like portion 45 which is engaged by clutch jaws, to be presently described. Positioned between the lower end of the cylindrical body 18 and the flanged portion 22 is an annular metallic ring 46 which has an inwardly extending flange portion 47 and this functions to hold a plurality of jaws 48 in positions for engaging said jaws with and disengaging them from the capped bottles. The ring 46 with its flange portion 47 might be termed a "body ring."

The jaws 48 of the bottle chuck are of substantially the same cross-section throughout and the description of one of these is sufficient for all of them and there are six in number. Each jaw has a vertical portion 55, the lower extremity 56 of which carries a rounded or lobe-shaped protrusion 57. Joining the upper portion of 55 is a portion 58 which extends radially when the jaws are assembled and which cooperates with the ledge 47 of the ring 46, as may be clearly seen in Figure 2. Joining the portion 58 is a tapered portion 59, the inner surface 60 of which is in contact with the camming head 42. The jaw also includes a portion 61 which is parallel to the axis of the rod 24 and clears the boss 41 which supports the camming head 42.

In Figure 3, I show the chuck jaws 48 grouped as they appear in the assembly, and in Figure 4 I show the chuck jaws per se as they would be seen along the line 4—4 of Figure 3, and in Figure 4 it will be noted that the several jaws 48 are spaced apart by spaces designated as 49, 50, 51, 52, 53 and 54.

The threaded boss portion 31 is connected to a source of air under negative pressure, or vacuum. The piston rod 24 and its enlarged portion 37 are free to move downwardly through the stepped hole in the clamp element 39 so that when the piston assembly is moved by the spring 33 said assembly will move until the disc 27 makes contact with the disc portion 40 of the clamp 39. When said assembly is in this extended position the portion 37 of the piston rod projects beyond the bore of the camming head 42 and when in its position the washer 29 between the discs 26 and 27 is below the radial holes 23 and air is admitted via said holes above the piston assembly and thence into the chamber 62. The function of this will be presently described.

As set forth above the boss 31 is connected to a source of vacuum. Now, when the chuck is moved downwardly and axially in respect to the neck of a bottle, the force of the compressed spring 33 bearing on one end of the wall 34 forms the bottom of the counterbore 35 and the other end of this spring presses against the disc 26 and thereby urges the jaws 48 downwardly tending to open the jaws so that they may readily slide over the cap 13 and neck 12 of a bottle. In some instances, the pressure of the spring 33 alone causes the jaws 48 to swing in a direction to bring the lobes 57 outwardly on a circle of larger diameter so that the positioning of the chuck over the cap and neck of a bottle is facilitated. Now, as soon as the lugs 57 engage the annular ring portion 45 on the bottle they slide over the ring and following this the space 62 within the body 10 is subjected to at least partial vacuum which causes the piston 25 to move upwardly and the camming surfaces 60 all swing outwardly about the portion 58 as a fulcrum and this causes the lugs 57 to closely engage the neck of the bottle below the ring 45. Now, if a bottle so gripped is moved to another location by moving the bottle chuck and its support, the bottle can not fall out of the chuck unless it is released by means of a special release. Therefore, the bottle (or a row of bottles if they are in a row) may be bodily moved from one place to another. Now when it, or they, are moved to another place the interior 62 of the body may be again subjected to pressure which effects the release of the bottle by moving the jaws so that their lobes or lugs 57 are disengaged from the ring portion 45.

*The rejection of uncapped bottles*

When the chuck is lowered by the support 11 to a position over the neck of a bottle on which no cap has been placed (due to inadvertence or other causes) the jaws will close due to the pressure of the top of the bottle 12 on the camming head 42. The lower end 37 of the piston rod will enter the open end of the bottle 12 (which does not contain cap) and will remain in an extended position. The piston assembly will remain with disc 27 in contact with the disc portion 40 of the clamp 39. The piston assembly at the same time remains in the enlarged bore 17 of the body 14 in such a position that the series of holes 23 in the cylinder wall are above the piston and do admit air in greater volume than can be removed through the bore 36 by a pump or other source of negative pressure. Now, this prevents sufficient vacuum from forming in the interior 62 of the body to operate the clamp 39. Due to this, when the chuck is raised the jaws will open and release the uncapped bottle. This means that the chuck will select and move only bottles which have been capped. This in a way constitutes a part of the inspection operation because the inspector glances at the filled packing case before it is sealed up and can replace the missing bottles from a source near at hand and at the same time he can call an assistant to come and repair the bottle capping mechanism to prevent this from occurring regularly.

In other words, the piston rod 24, 37 and the series of holes 23 in the wall of the cylinder 10 plus the absence of a cap on a bottle controls the rejection of the uncapped bottles.

I have found that my new and improved bottle chuck is useful, is easy to control, operates on a minimum of negative pressure and is simple and includes nothing to get out of order.

Although I have herein shown and described by way of example on embodiment of the invention, it will be understood that many changes may be made in the arrangements shown and described within the scope of the following claims.

What is claimed is:

1. A bottle chuck comprising a hollow cylindrical body having an upper and a lower end, said cylindrical body being vertical, the upper end of said body being closed and having an opening for the application of vacuum, the lower end being open and having a horizontally located annular internal recess having a lower surface for supporting jaws, a plurality of vertically-disposed jaws within the lower end of said body, and arranged in a hollow circle in a horizontal plane, said jaws having upper and lower parts, the upper part of said jaws having outwardly extending fulcrums relative to the hollow of said body, means for holding said fulcrums in said recess, the lower part of said jaws having inwardly extending projections relative to the hollow of said body and being adapted to grip the neck of a bottle, a piston in said body, a piston rod secured to and extending downwardly from the under side of said piston, a clamp having upper and lower ends and located within said body below said piston and extending into the hollow circle within said jaws, cam surfaces adjacent to the lower end of said clamp in a horizontal plane opposite said fulcrums, complementary cam surfaces on the inside of and at the upper end of said jaws extending over the cam surfaces of said clamp, said clamp having a central vertical bore through which said rod passes, an enlargement in the lower part of said bore forming a shoulder, an enlargement on the lower end of said rod adapted to engage said shoulder and lift said clamp on upper movement of said rod, the side of said body having at least one hole so located that it is below said piston at its uppermost position and above said piston at its lowermost position, whereby the application of vacuum when said piston is at its lowermost position will draw air through said hole and will not cause said jaws to close about the neck of a bottle.

2. A bottle chuck according to claim 1 in which said clamp has a disk on the upper end thereof in said cylinder, said disk being below said holes.

3. A bottle chuck according to claim 1 in which a spring at the upper end of said cylinder located between the top of said piston and the upper end of said body is adapted to bias said piston downwardly.

4. A bottle chuck according to claim 1 in which the lower external portion of said body has threads, a complementary internally threaded member held on said threads, said means for holding said fulcrums in said recess comprising an inwardly extending flange at the lower end of said member.

References Cited in the file of this patent

UNITED STATES PATENTS

| 1,317,363 | Gasche | Sept. 30, 1919 |
| 1,987,336 | Powell | Jan. 8, 1935 |
| 2,253,283 | Minaker | Aug. 19, 1941 |
| 2,283,614 | Schmidt | May 19, 1942 |
| 2,359,433 | McNamara | Oct. 3, 1944 |
| 2,561,536 | Rowe | July 24, 1951 |
| 2,665,013 | Socke | Jan. 5, 1954 |
| 2,725,154 | Hendricks | Nov. 29, 1955 |
| 2,800,355 | Vinner et al. | July 23, 1957 |

FOREIGN PATENTS

| 833,847 | Germany | Mar. 13, 1952 |
| 63,807 | Sweden | Sept. 27, 1927 |